United States Patent [19]

Murakami et al.

[11] Patent Number: 4,841,502
[45] Date of Patent: Jun. 20, 1989

[54] INFORMATION RECORDING SYSTEM AND REPRODUCING FOR RECORDING AND REPRODUCING INFORMATION ON A MAGNETO-OPTICAL DISK

[75] Inventors: Teruo Murakami, Yokohama; Naobumi Seo, Tokyo, both of Japan

[73] Assignee: Kabushiki Kaisha Toshiba, Kawasaki, Japan

[21] Appl. No.: 871,558

[22] Filed: Jun. 6, 1986

[30] Foreign Application Priority Data

Jun. 14, 1985 [JP] Japan .................. 60-128265
Sep. 17, 1985 [JP] Japan .................. 60-203325
Oct. 7, 1985 [JP] Japan .................. 60-221771

[51] Int. Cl.⁴ .................... G11B 13/04; G11B 11/12
[52] U.S. Cl. ................ 369/13; 360/114; 369/100; 369/111
[58] Field of Search ............ 369/13, 110, 54, 58, 369/32, 100, 111; 360/59, 114, 77, 35.1; 365/122

[56] References Cited

U.S. PATENT DOCUMENTS

| | | | |
|---|---|---|---|
| 3,413,483 | 11/1968 | McCarthy .................. | 365/127 |
| 3,914,791 | 10/1975 | Stebe ........................ | 360/77 |
| 3,946,367 | 3/1976 | Wohlnut et al. ............ | 369/46 |
| 4,094,013 | 6/1978 | Hill et al. .................. | 365/234 |
| 4,142,209 | 2/1979 | Hedlund et al. ............ | 365/234 |
| 4,287,540 | 9/1981 | Cheathaur et al. ......... | 360/77 |
| 4,494,226 | 1/1985 | Hazel et al. ............... | 369/58 |
| 4,523,304 | 6/1985 | Satoh et al. ............... | 369/32 |
| 4,545,044 | 10/1985 | Satoh et al. ............... | 369/58 |
| 4,546,463 | 10/1985 | Ophey et al. .............. | 369/110 |
| 4,561,032 | 12/1985 | Matsumoto et al. ........ | 369/110 |
| 4,564,931 | 1/1986 | OHara et al. .............. | 369/110 |
| 4,577,240 | 3/1986 | Hedberg et al. ........... | 360/35.1 |

FOREIGN PATENT DOCUMENTS

| | | | |
|---|---|---|---|
| 3018415 | 11/1980 | Fed. Rep. of Germany ...... | 360/114 |
| 3500325 | 7/1985 | Fed. Rep. of Germany ...... | 360/114 |
| 57-64334 | 4/1982 | Japan .................. | 369/54 |
| 59-38951 | 3/1984 | Japan .................. | 369/13 |
| 59-117703 | 7/1984 | Japan . | |
| 59-217250 | 12/1984 | Japan . | |
| 60-7635 | 1/1985 | Japan . | |
| 60-13304 | 1/1985 | Japan .................. | 360/114 |

OTHER PUBLICATIONS

IEEE Transactions on Magnetics, vol. MAG-20, No. 5, (Sep. 1984) "Erasable Magneto-Optical Recording Media".

Primary Examiner—Alan Faber
Assistant Examiner—Hoa T. Nguyen
Attorney, Agent, or Firm—Foley & Lardner, Schwartz, Jeffery, Schwaab, Mack, Blumenthal & Evans

[57] ABSTRACT

An information recording and reproducing system for a magneto-optical disk having first and second optical systems each including at least first and second optical heads arranged in the positions displaced for example, by ¼ sectors with each other. A single sector address control unit connected to the first and second optical heads for detecting each sector address on a disk and for controlling each access of the first and second optical means to each of desired sectors on the disk, through a magneto-optical disk control unit. The first and second optical heads are positioned at a first position, e.g., sector head position, of one sector, the second optical head is positioned at a second position, e.g., data position of the other sector, such that when either one of the first or second optical head is detecting one sector address, the other has finished in the address detection for the other sector address. In addition, the optical heads carry out an erasing operation prior to the information recording on the disk. Fast and safe recording of information becomes possible.

6 Claims, 10 Drawing Sheets

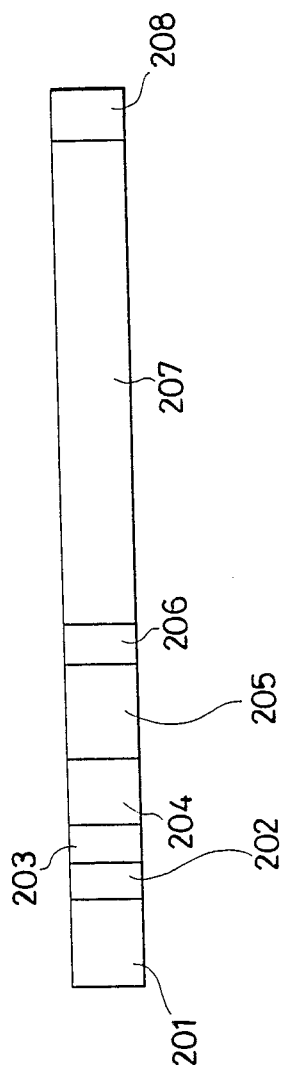
FIG. 2
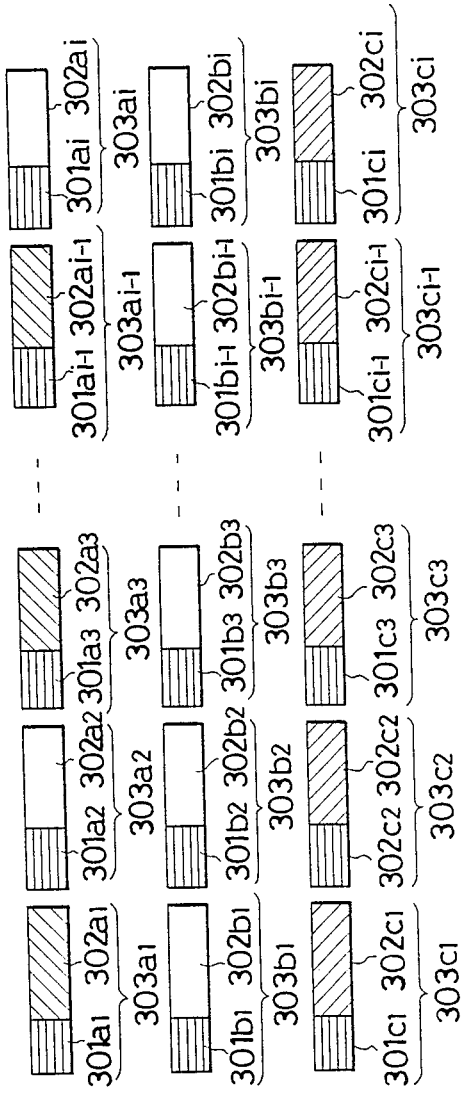
FIG. 3(a)
FIG. 3(b)
FIG. 3(c)

INFORMATION RECORDING SYSTEM AND REPRODUCING FOR RECORDING AND REPRODUCING INFORMATION ON A MAGNETO-OPTICAL DISK

BACKGROUND OF THE INVENTION

1. Field of the Invention

The present invention relates to an information recording and reproducing system for recording and reproducing information on a magneto-optical disk.

2. Description of the Prior Art

Along with an increase in the capacity and operation speed of electronic computers in recent years, high density and large capacity for the memory device that constitutes the principal part of computers are being demanded to an increasingly high degree. With respect to such memory devices, there are known, for instance, an optical disk file device which records and reproduces information as a bit sequence that can be read optically, and a magnetic recording device which carries out recording of information on a recording medium with magnetic layers, by magnetically inverting magnetization, depending upon the information. Also known are erasable magneto-optical disk devices which record and erase information by means of irradiation of laser light and an application of a magnetic field, and reproduces information by irradiation of laser light. Among the various memory devices, one which is attracting the attention most and studied most actively is the information recording and reproducing device that makes use of an optical disk. This device records information by irradiating an optical disk with a laser beam that is squeezed to a spot with a diameter of about 1 μm to form a bit that has a width of 0.6 to 1 μm and a length of 1 to 2 μm. On the other hand, reproduction of recorded information is carried out by detecting the changes in the reflected or transmitted light from the bits recorded on the optical disk.

As to the optical disk recording media to be used for such a device, there exists a recording medium of direct read after write (DRAW) type for which it is impossible to erase and re-record information, and a recording medium of erasable type for which it is possible to re-record (erase or record) information a plurality of times. The information recording and reproducing device that makes use of a recording medium of the DRAW type has an advantage because of its impossibility of rewriting information. However, from the viewpoint of economy and effectiveness of the medium, recording medium of an erasable type is superior.

A recording medium of the erasable type has an amorphous alloy film that is composed of rare earth elements such as Gd, Td, Dy, and Ho and transition metals such as Fe and Co, as the recording film. From the magnetically ordered condition maintained at room temperature, and with the easy axis of magnetization in the direction perpendicular to the magneto-optical film, a magnetically disordered state can be obtained by irradiating the recording film (perpendicularly magnetized film) with a laser beam or the like.

The magnetically ordered and disordered states here means the conditions in which the coercive force of the easy axis of magnetization are securely held and decreased, respectively. If an external magnetic field with a predetermined direction is applied to the recording film when it is in a magnetically disordered state, the easy axis of magnetization of the recording film rotates toward the direction of the magnetic field applied. In this configuration, it becomes possible to carry out recording or erasing.

Now, the method of recording information on the recording film, which has all of its magnetic domains arranged in the same direction (for example, in the downward direction) in a state where there is no information recorded, will be described in detail.

A laser beam, which is modulated in accordance with the information, is focused to a size with a diameter of about 1 μm, and is made to irradiate the recording film to heat it locally with the energy of the laser beam to reduce the coercive force of that portion of the film. In this case, by applying an external magnetic field (usually, less the 1 kOe) with a direction which is opposite to the initial direction (downward direction) of magnetization, the local direction of magnetization alone will be reversed. A portion of the recording film other than the portion that is irradiated by the laser beam will not undergo a change in the initial direction of magnetization (inversion) even under an application of an external magnetic field. Therefore, there will be formed a pattern that has a different direction (upward direction) of magnetization within a uniform field of magnetization. That is, it corresponds to a recording of information.

Next, a method of erasing previously recorded information by means of a principle which is nearly the same as in the above will be described. Namely, one needs only to select the direction of a magnetic field to be opposite to the direction of the magnetic field that was applied at the time of recording the information. For instance, by irradiating the recorded portion of the recording film with a laser beam and by applying an external magnetic field with a direction which is opposite to that at the time of recording, the direction of magnetization returns to the state which is the same as prior to recording, information previously recorded is erased.

Further, for reproducing information, differing from the case of recording and erasing, use will be made of the rotation of a plane of polarization of the laser beam. On the recording film (perpendicularly magnetized film) of the recording medium, there are disposed magnetic domains perpendicularly. When the film is irradiated by a laser beam, the direction of polarization of the reflected (or transmitted) light rotates according to the direction of the magnetic domain. In other words, if a linearly polarized laser beam irradiates the surface of the film, the plane of polarization of the reflected light rotates slightly depending upon the direction of magnetization of the film. The rotation of the plane of polarization is detected by a light detector and signal, due to the direction of magnetization of the film, is converted to the intensity (1 or 0) of the reflected light, thus reproducing the information.

As stated above, recording, reproducing, and erasing of information are performed by making use of the sense of magnetization of each magnetic domain.

With respect to a memory with the recording film having the above mentioned features, the erasable medium is called a magneto-optical disc. Although this magneto-optical disc is erasable, it is inappropriate to carry out writing operation directly on an area which has already undergone the previous writing operations, since the domain inversed by the previous operations is left as it was. Because of this, an erasing operation on the area of the medium where writing is made is necessary in advance, which would allow for new information to be written on the area. Of course where only one head is available, it takes twice the time to complete a re-recording operation on the recorded medium.

As to methods for rewriting information, there exists, for example, a magneto-optical device for recording, reproducing, and erasing as is disclosed in Japanese Patent No. 59-217250. This device has an optical system for recording which carries out recording of desired information, and another optical system for erasing and reproducing which erases unnecessary information or reproduces information which was written by the recording optical system. With such an arrangement, it becomes possible to partially erase unnecessary information alone, and at the same time, to record new information while erasing old information.

However, in attempting to apply such a concept to a practical device, there still remains certain unsolved technical problems. For example, 1. The provision of two heads requires a large hardware and a sophisticated control system.

2. In carrying out reproducing, it can perform only signal reproduction which is entirely identical to the case of ordinary optical system with one system, such that effective utilization of the system is not at all realized in spite of the fact that two optical systems are provided in the above patent disclosure.

3. Clearly, there has not been a sufficient response for information that is transported successively (continuously flowing information).

4. The waiting time for rotation, in accessing the optical system to the position where rewriting is desired, is too long.

5. In addition, the size of the recording bits for such a device is extremely small, being on the order of one micrometer. Accordingly, even dust, scratches, pinholes, etc., could become the cause of the faulty signals in recording or reproducing, which results in large error rates compared with the case of a magnetic disk and the like. Thus, the magneto-optical disk device is not put to practical use unless these technical problems are resolved.

SUMMARY OF THE INVENTION

An object of the present invention is to provide an information recording system which is capable of making practical application of an optical system with two systems in an effective manner.

Another object of the invention is to provide an information recording system which is capable of carrying out rewriting of information at a high speed.

A further object of the invention is to effectively control an optical system having two heads.

A further object of the invention is to provide an information recording system which makes it easy to control sectors in the recording medium.

A further object of the invention is to provide an information recording system which makes it easy to control errors on the recording medium.

A further object of the invention is to provide an information recording system which is capable of performing the sector access of the head with a smaller loss in time.

A further object of the invention is to provide an information recording system which is capable of operation with high reliability.

BRIEF DESCRIPTION OF THE DRAWINGS

FIG. 2 is a schematic block diagram for the sector,

FIG. 3a-c, is a diagram for illustrating the recorded state of the sector on the recording medium in re-recording process.

DETAILED DESCRIPTION OF THE PREFERRED EMBODIMENTS

Figure 1:
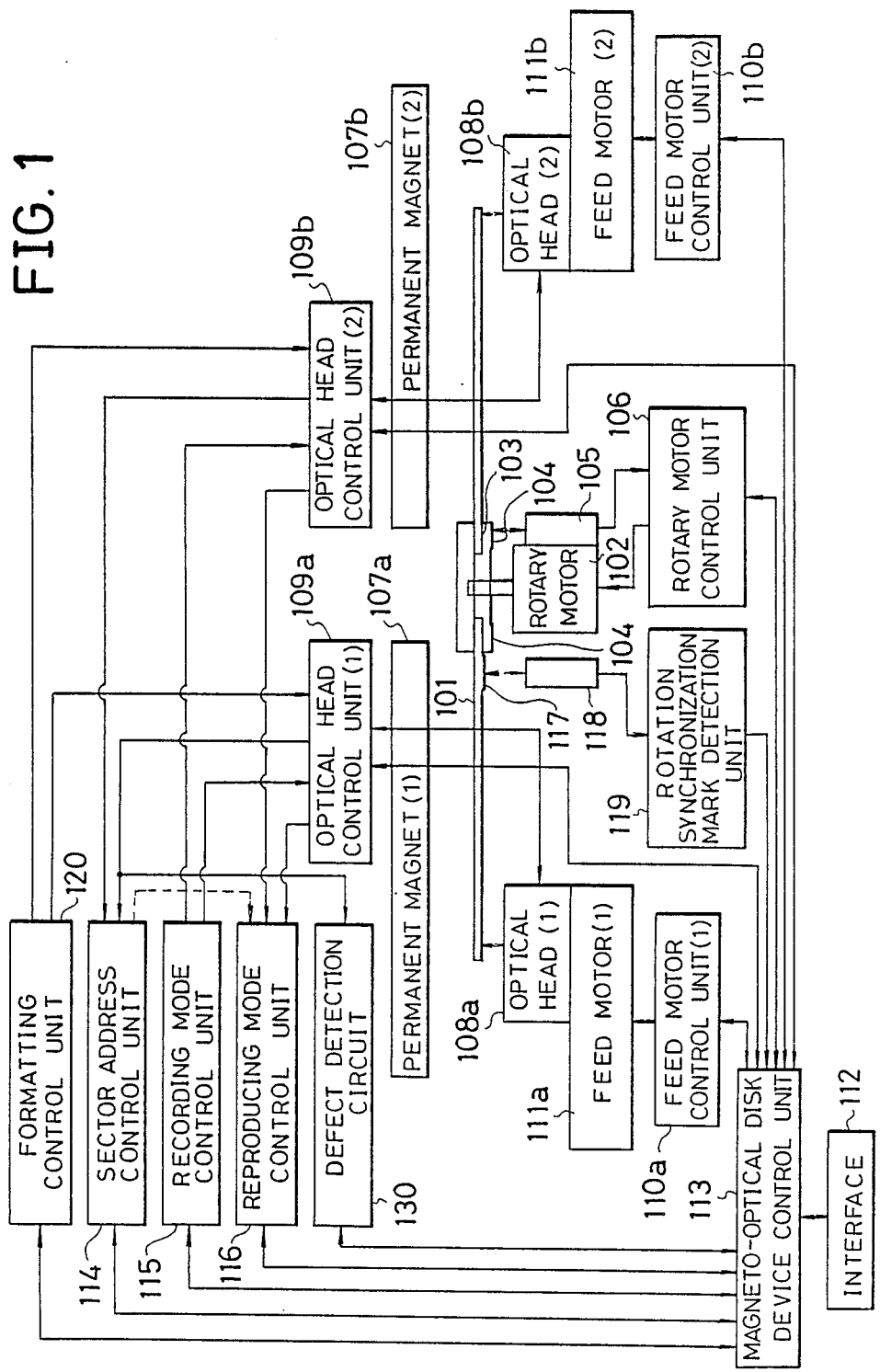
FIG. 1 is a schematic block diagram for a device embodying the invention.
Figure 4:
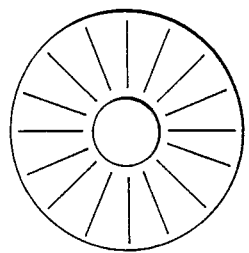
FIG. 4 is a view of the pattern on the turntable.

FIG. 1 is a schematic block diagram for an optical information recording and reproducing device which is an embodiment of the invention that uses a magneto-optical disk as the recording medium. A magneto-optical disk 101 is mounted on a turntable 103 that is placed above a rotary motor 102. At the position 104 on the turntable 103, there are provided rotation control patterns that are patterned radially with a predetermined separation, as shown in FIG. 4. The rotation control patterns 104 are provided so as to rotate the magneto-optical disk 101, attached to the turntable 103, at a predetermined speed. The rotation of the turntable is detected by an optical detector for rotation control 105. The detected signal is input to the rotary motor control unit 106 where the drive and rotation of the rotary motor 102 is controlled to produce a predetermined speed of rotation.

References 107a and 107b are magnetic field generating elements that consist of permanent magnets (1) and (2) with mutually reversed polarities. These magnets have a sufficient length, and also a uniform and sufficiently high intensity magnetic field in the radial direction of the magneto-optical disk 101. Thus, they provide a magnetic field which is required for recording and erasing the entire recording region of the magneto-optical disk.

References 108a and 108b are optical heads (1) and (2), respectively, each consisting of a laser, photo-detectors, optical element, and so forth. They irradiate the magneto-optical disk 101 with laser beams, and detect control signals for tracking and focusing the signals for information reproduction. These optical heads are controlled by the optical head control units (1) and (2), which are given reference numerals 109a and 109b. The optical head (1) 108a and the optical head (2) 108b are supported by the feed motor (1) 111a and the feed motor (2) 111b which are connected to the feed motor control unit (1) 110a and the feed motor control unit (2) 110b, respectively. Each of these optical heads can be moved to an arbitrary radial position on the magneto-optical disk 101. Moreover, the permanent magnet (1) 107a, the optical head (1) 108a, and the feed motor (1) 111a form a first system, and the permanent magnet (2) 107b, the optical head (2) 108b, and the feed motor (2) 111b form a second system.

The optical information recording and reproducing device of the present embodiment possesses a recording mode, a reproducing mode, and a formatting mode. In executing recording/reproducing mode, recording/reproducing mode indication signal, recording/reproducing sector address, recording/reproducing information bit number, information signal, and others are transferred from an external system, not shown, to a magneto-optical disk device control unit 113 via an interface 112. Then the sector indicated by a sector address control unit 114 is accessed, and each of the above modes are executed for a sector unit that consists of a fixed number of information bits by a recording mode control unit 115 and a reproducing mode control unit 116.

Further, in the magneto-optical disk 101, there are formed beforehand rotation synchronization marks 117 for generating rotation synchronization signals at the rate of one pulse per rotation. The rotation synchronization marks 117 are detected by an optical detector for rotation synchronization mark 118 and a rotation synchronization mark detection unit 119. With the formation of the rotation synchronization mark 117 as the reference, a sector control signal, which includes the sector address under consideration, is formatted in a formatting control unit 120 according to a fixed format. The form of the rotation synchronization mark 117 will be made clear in the latter half of this document.

Referring to FIG. 2, the formatting will be described next.

FIG. 2 illustrates a simplified composition of a sector which is the unit in recording or reproducing information. A sector consists of a synchronized signal (1) 201 for reproducing the address of the sector, a header (1) 202 for indicating the starting position of the sector address, a sector address 203, a gap (1) 204, a synchronized signal (2) 205 for reproducing the recorded information, a header (2) 206 for indicating the starting position of the recorded information, an information signal 207 that consists of a fixed number of information bits, and a gap (2) 208. Here, the synchronized signal (1) 201, the header (1) 202, and the sector address 203 form a sector control signal which is formatted according to the specification of the system preceding recording of the information in the magneto-optical disk 101 as mentioned above.

Referring to FIG. 3, a detailed description will be given concerning the operation of executing the recording of information that is transferred from an external system, according to the recording mode of the present invention.

When a recording mode indication signal, and information on the recording information bits, and the sector to be recorded are transferred from an external system, the magneto-optical disk device control unit 113 reproduces and detects the sector address by the sector address control unit 114. The unit 113 then lets the optical head (1) 108a and the optical head (2) 108b access the track on which is located the indicated sector, by the action of the feed motor control unit (1) 110a and the feed motor control unit (2) 110b. Then, at optical head (1) 108a of the first system that includes the permanent magnet (1) 107a, given a polarity determined in accordance with the recording mode control unit 115, a magnetic field is produced with the direction for erasure. The direction of the magnetic domain is arranged uniformly in a fixed direction by means of the erasure operation in which the information bit recording regions are irradiated continuously in succession, regardless of the presence or absence of information, with a laser light of a predetermined intensity.

FIG. 3 (a) is a diagram for illustrating the state of the magneto-optical disk 101 indicated by the external system, prior to the execution of the recording mode. Namely, assume that the information bit number transferred from the external system indicates recording to a number $i$ or sectors, corresponding to the sectors $303a_1$ to $303a_i$.

The regions $301a_1$ to $301a_i$ are where information concerning the sector addresses for the sectors $303a_1$ and to $303a_i$ are formatted. Each of them consists of a synchronized signal (1) 201, a header (1) 202, and a sector address 203 as shown in FIG. 2, where the sector address increases from $301a_1$ to $301a_i$. Moreover, $302a_1$ to $302a_i$ are the regions for recording the informations signals, and each of them consists of a gap (1) 204, a synchronized signal (2) 205, a header (2) 206, an information signal 207, and a gap (2) 208 as shown in FIG. 2. Furthermore, the hatched regions $302a_1$, $302a_3$, and $302a_{i-1}$ are where some kinds of information have already been recorded, whereas no information is recorded in the blank regions of $302a_2, \ldots,$ and $302a_i$.

FIG. 3 (b) is a diagram for illustrating the state of the indicated sectors after an erasing operation is performed in which the regions $301b_1$ to $301b_i$ and the regions $301a_1$ to $301a_i$, $302b_1$ to $302b_i$, $302a_1$ to $302a_i$, $303b_1$ to $303b_i$, and $303a_1$ to $303a_i$ signify, respectively, identical regions. In other words, the hatched regions of FIG. 3 (a) are in a state in which the magnetic domains of the regions for recording information are, as a result of an erasure operation, arranged uniformly in a fixed direction which is specified by the system.

Next, the sector whose information is erased by the optical head (1) 108a of the first system is rotated by the rotary motor 102 and is brought to the position of optical head (2) 108b of the second system which includes permanent magnet (2) 107b, having a polarity which is determined to generate a magnetic field in the direction for recording information. Then the information transferred from the external system is recorded, in turn, in the regions whose magnetic domains are in a fixed direction by an erasure operation, in accordance with the recording mode control unit 115. This is done by turning on/off the laser light from the optical head (2) 108b. FIG. 3 (c) is a diagram which illustrates the state of the regions of the indicated sectors after an operation of recording information. Here, the regions $301c_1$ to $301c_i$ and the regions $301b_1$ to $301b_i$, $302c_1$ to $302c_i$, $302b_1$ to $302b_i$, $303c_1$ to $303c_i$, and $303b_1$ to $303b_i$ indicate, respectively, identical regions. New information bits or the like are recorded in the regions $302c_1$ to $302c_i$.

More specifically, the region that is erased by an erasure operation is a continuous region that consists of a portion that includes a rear end of the gap (2) 204, the synchronized signal (2) 205, the header (2) 206, the information signal 207, and a portion that includes the front end of the gap (2) 208. However, recording is made anew in the synchronized signal (2) 205, the header (2) 206, and the information signal 207 in the erased region. Namely, a region which is sufficiently wider than the region required for new recording is erased first.

Figure 5:
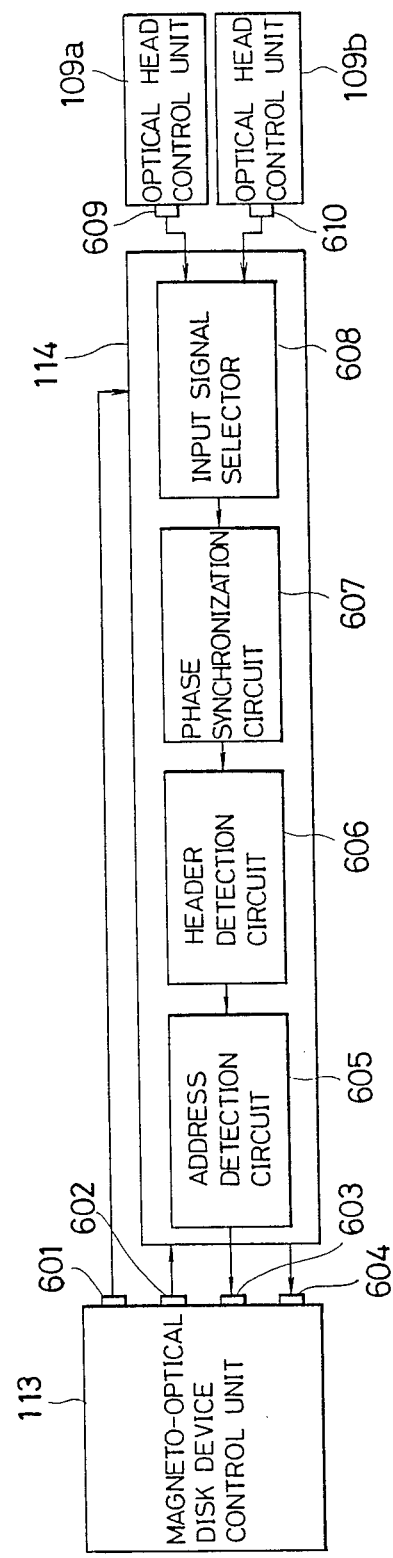
FIG. 5 is a block diagram for illustrating an embodiment of the sector address control unit.

FIG. 5 is a diagram for illustrating an operation of the sector address control unit 114 in detail. In the present embodiment a first reproduced signal from an optical head reproducing signal output terminal 609 due to the optical head control unit (1) 109a and a second reproduced signal from an optical head reproducing signal output terminal 610 due to the optical head control unit (2) 109b, of the signal that is recorded on the magneto-optical disk 101, are input to the input signal selector 608 of the sector address control unit 114. Then, one of the two reproduced signals is selected in accordance with the signal from the optical head switching signal output terminal 601 of the magneto-optical disk device control unit 113, and the sector address is reproduced and detected. Namely, when a signal from a sector address detection command output element 602 of the magneto-optical disk device control unit 113 is input to the sector address control unit 114, the signal to a sector address detection status input terminal 604 becomes BUSY, and is selected by the input signal selector 608, indicated by the signal from the optical head switching signal output terminal 601. Then, the selected reproduced signal is led to a phase synchronization circuit 607, the starting position of the sector address signal is detected by a header detection circuit 606, and the sector address is reproduced and detected in an address detection circuit 605. After reproducing and detecting the sector address, the signal to the sector address detection status input terminal 604 is changed to READY, and the magneto-optical disk device control unit 113 reads the sector address 603 that was detected.

Figure 6:
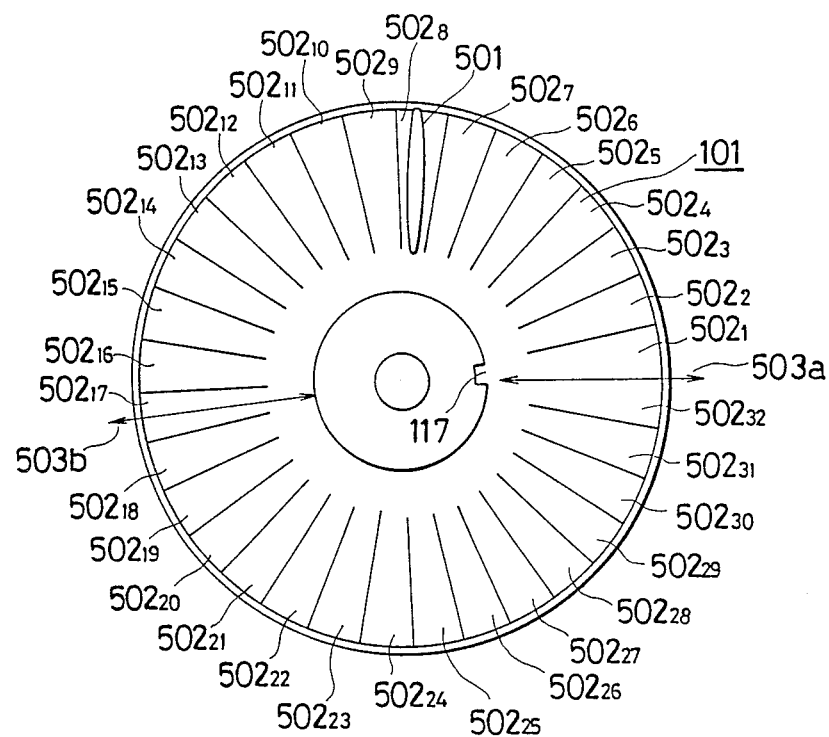
FIG. 6 is a diagram for illustrating the configuration of the sector on the recording medium having an even number of regions.
Figure 7:
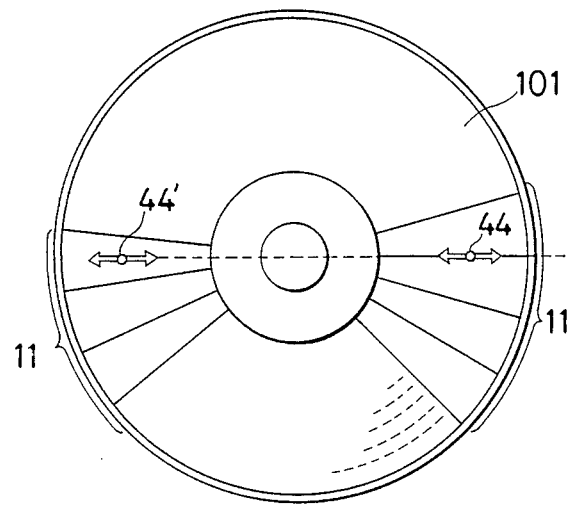
FIG. 7 is a diagram for illustrating the relative positions of two magneto-optic heads in a sector which is divided into an odd number of regions, FIG. 8, a and b, is a diagram for illustrating the arrangement of magneto-optic heads which are suited for both of division in an odd and an even number of regions.

FIG. 6 is a diagram for showing the first system that performs an erasure operation at the time of recording information prior to a recording operation, the second system that records information in the erased regions, and the relative positions of the sectors on the magneto-optical disk. Accordingly, what is meant by an erasure operation or a recording operation is a series of operations for carrying out erasure or recording of information, by confirming the addresses of indicated sectors through reproduction of the sector addresses and by detecting further the respective predetermined positions.

The magneto-optical disk 101 is driven by a rotary motor 102 to be rotated in the clockwise direction so as to be given a predetermined angular velocity. The recording region 501 on magneto-optical disk 101 has essentially been partitioned by radii with rotation synchronization marks 117 as reference. The mark 117 may protrude as shown in the figure. The Sectors $502_1$ to $502_{32}$ gave a sector composition which is the same as shown in FIG. 2, and the sector addresses are assigned to respective sectors from $502_1$ to $502_{32}$ and from the inner periphery to the outer periphery one after another.

The arrow 503a is the first system for performing an erasure operation of information, and indicates the direction of motion of a light spot on the recording film that is controlled by the optical head (1) 108a when it is to be accessed in the radial direction of magneto-optical disk 101. Further, arrow 503b is the second system for performing a recording operation of information, and indicates the direction of motion of a light spot on the recording film that is controlled by optical head (2) 108b.

Here, the relative position of optical heads 108a and 108b is such that when the first optical head (1) 108a for erasure is, for example, at the head of a sector accessed, the other optical head (2) 108b for recording is situated at about the middle of the sector.

In other words, when the optical heads are arranged such that one of the optical heads is reproducing the sector address, specifically, when the sector address control unit 114 of FIG. 1 is in execution, the other optical head has already completed reproduction of the sector address and is performing an erasure operation or recording operation of information by actuating the recording mode control unit 115. In this way, the timing for the sector address, reproducing the detection of the sector, and the ensuing execution of the erasing and reproducing operations of recorded information is staggered between the two optical heads.

With this arrangement, prior to recording of information bits at the time of executing the recording mode, the recording regions are erased regardless of whether or not the regions are recorded previously. Therefore, not only is double writing of information and unwittingly leaving information without erasure in the recording regions avoided, but it can be further made unnecessary to check on the system side, whether or not information is already recorded in the recording regions, or whether or not information is already erased. Therefore, it is possible to provide a device which has an easy system control and is convenient to use. Further, by providing two sets of optical heads, it becomes possible to reduce the time required for execution of recording to about one half. Moreover, by staggering the timing of sector address detection of the two optical heads, it becomes possible to reproduce and detect sector addresses of the two optical heads with the same sector address control unit. In addition, control of the two optical heads can be carried out easily using one control system instead of two control systems that would be required for the respective optical heads.

In the above embodiment, a magneto-optical disk which is divided radially into an even number of equal sectors was utilized. However, it should be obvious that similar effects can be obtained, even if the magneto-optical disk is divided into an odd number of sectors per rotation, provided that the radial directions of motion of the first and the second systems are arranged at opposite positions, in compliance with direction of the present invention.

Figure 8A:
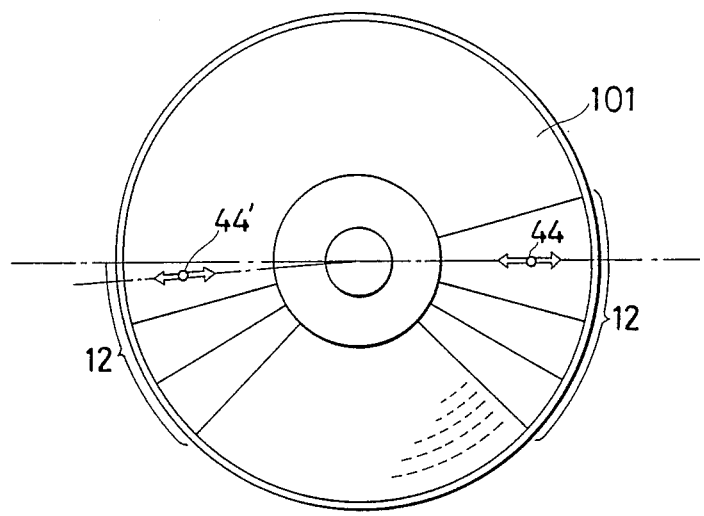
Figure 8B:
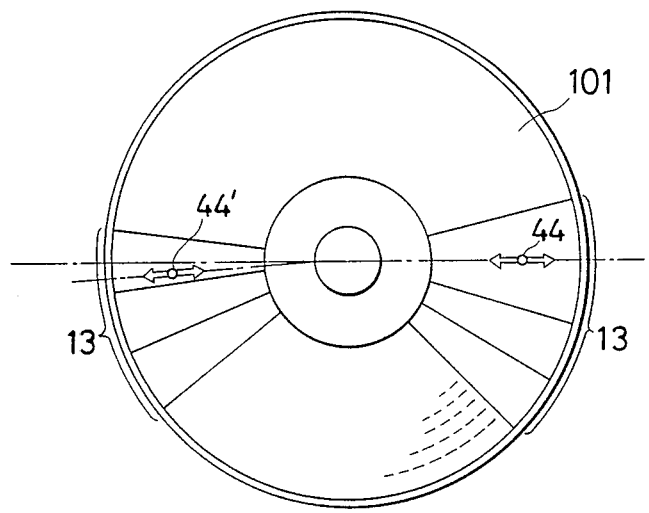

Moreover, it is possible to set moving positions of the magneto-optical heads so as to be usable for either case of division into an even and division into an odd number of sectors. FIGS. 8(A) and 8(B) are the diagrams for illustrating sectors 12 and 13 and the relative positions of magneto-optical heads 44' and 44 for the cases when magneto-optical disk 101 is divided equally into an even and odd numbers of sectors, respectively. The positional relationship of magneto-optical heads 44', and 44 is arranged to be the same for both FIGS. 8(A) and 8(B).

This can be realized by arranging magneto-optical head 44 for recording by about a quarter of a sector width removed from a position opposite to magneto-optical head 44' for erasing. In fact, the schematic block diagram shown in FIG. 2, region 203, where information concerning the sector address is buried, corresponds to about 200 bits while recording region 207, for information signal, corresponds to about 4,000 bits. Therefore, the effects mentioned in connection with an embodiment of the invention can be realized positively by a shift of one quarter of a sector width. Further, because of the compatibility of a magneto-optical disk 101 that is divided into an even number of equal sectors an a magneto-optical disk 101 that is divided into an odd number of equal sectors, the device can accommodate all kinds of magneto-optical disks, in addition to the realization of the effects mentioned earlier.

Moreover, the invention is by no means limited to the above embodiment. Thus, for example, the optical heads and elements for generating magnetic fields may be arranged on the same side of the magneto-optical disk.

In the foregoing, detection of a sector address has been described. A detailed description will be given concerning a recording method which makes an effective application of two optical systems. Namely, it is a method to examine, prior to recording on magneto-optical disk 101, the state of the recording surface of disk 101, and to vary the recording device depending upon whether or not the surface is in a condition suitable for the device.

As an option, there may be added a defect detection circuit 130 as indicated in block diagram in FIG. 1.

During an execution of the recording mode, a signal from optical head control unit (1) 109b is divided into two parts, one part is input to the sector address control unit 115 as described above, while the other is input to the defect detection circuit 130. In defect detection circuit 130, all of the defects, such as dust, scratches, and pinholes, that may exist on magneto-optical disk 101 and become the cause of errors in the signals are detected, to judge whether or not they are above a predetermined standard. The operation of executing the recording mode in accordance with this method, for a recording information that is transferred from an external system, will now be described briefly.

When a recording mode indication signal, information bits to be recorded, and information on recording sector are transferred from an external system, the magneto-optical disk device control unit 113 carries out reproducing and detection of a section address in the section address control unit 114. Optical head (1) 108a and optical head (2) 108b are given access to a track on which is located an indicated sector by feed motor control unit (1) 110a and feed motor control unit (2) 110b. Then, the directions of the magnetic domains are in a uniformly fixed direction under an erasure operation through continuous irradiation. The irradiation is done in turn of the information bit recording regions of the indicated sectors, regardless of whether there exists information, with a laser light of a predetermined intensity. This process is done by optical head (1) 108a of the first system which includes permanent magnet (1) 107a, whose polarity is determined, in accordance with the recording mode control unit 115, so as to generate a magnetic field with erasure direction. At the same time, defects beyond a predetermined standard that exist in the region are detected in the defect detection circuit 130 and transferred to magneto-optical disk device control unit 113. This will be described in detail later.

Next, the sector whose information is erased by means of optical head (1) 108a of the first system, is rotated by rotary motor 102 and is brought to a position of the optical head (2) 108b of the second system that includes permanent magnet (2) 107b with a polarity that is determined to generate a magnetic field in the direction for recording information. If the defects that exist in each region are below a fixed standard, information transferred from an external system is recorded in turn, in accordance with the recording mode control unit 115, in a region where the magnetic domains are arranged in a fixed direction by an erasure operation, through turning on/off of the laser light from optical head (2) 108b.

Next, a method of detecting defects will be described by referring additionally to FIG. 9.

Figure 9:
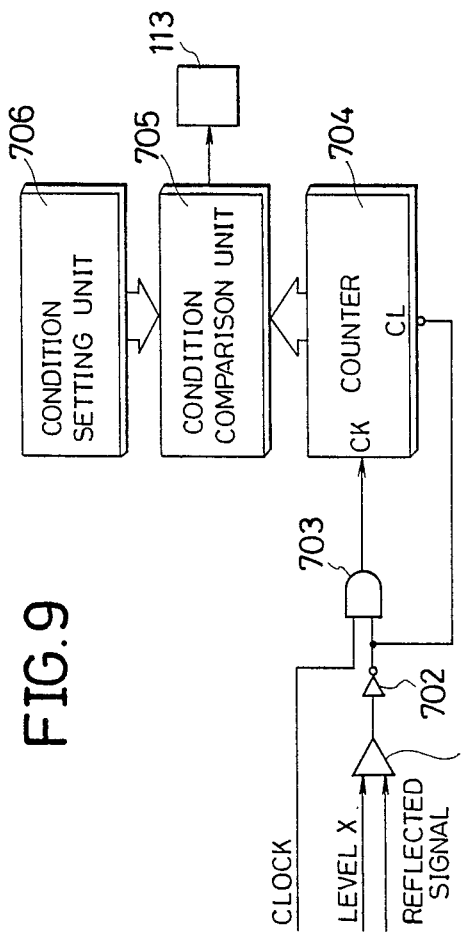
FIG. 9 is a block diagram for illustrating an embodiment of the fault detection circuit.

FIG. 9 is an embodiment for illustrating the operation of defect detection circuit 130. In this embodiment, defects are detected by detecting changes in the reflected light from magneto-optical disk 101, using optical head (1) 108a of the first system which carries out the erasure operation for information recorded previously.

During the erasure operation, a continuous laser light with a predetermined intensity is irradiated on magneto-optical disk 101. If there exists defects such as pinholes, dust, and scratches, the amount of reflected light is reduced. The defects are detected in a comparator 701 by comparing the reflected light with a predetermined level X of reflected light.

If the output level of magneto-optical disk 101 is above the level X, the output of the comparator 701 becomes High (H) level. Then, the invertor circuit 702 is inverted and the output of a counter 704 is cleared so that it can be determined from this signal that a defect did not exist. Next, if a defect does exist and the output of the reflected light becomes lower than the level X, the output of comparator 701 becomes Low (L) level, the output of invertor circuit 702 becomes H level which becomes an input to an AND circuit 703. In the AND circuit 703, the output from invertor circuit 702 and the clock undergo an AND operation, and outputs a clock signal for counter 704, in which there is obtained a counted value that corresponds to the length of the defect. The counted value is then sent to a conditional comparison unit 705.

The counted value of a defect thus detected and a predetermined value, which is set beforehand in a conditional setting unit 706, are compared in conditional comparison unit 705 to perform an effective detection of a defect which has a length that is larger than a predetermined value. The result is sent to magneto-optical disk device control unit 113. In addition, the defect information is recorded, as needed, in a predetermined region of magneto-optical disk 101 as an information for managing formatting to be used for processing and managing the information for each sector.

Further, by designating the defects detected by defect detection circuit 130 to be defects that are beyond the error correction ability of the system, for instance, by designating them as large burst-like defects, it becomes possible to construct a detection circuit in an economical manner.

In this manner, by the provision of two systems, information recording at high speed becomes possible. In addition, with respect to the execution of information recording, detection of defects without fail can be arranged prior to a recording of information, so that it becomes possible to provide a device that has low error rates and high reliability.

The defect detection can also be performed at the time of formatting, instead of at the time of recording information, as was done above. The detection method in the former case will now be described in the following.

First, prior to a recording of information, a magneto-optical disk 101, which is magnetized uniformly in a fixed direction in advance (a recording medium for which recording is to be made for the first time), is mounted as shown in FIG. 1. Then, magneto-optical heads 108a and 108b are moved to a position of the innermost circumference that is determined by the system (or the specifications). By driving magneto-optical head 108b successively in the direction toward the outer circumference, sectors as shown in FIG. 2 are formed. In constructing a sector, formatting signals consisting of a synchronized signal (1) 201, a header (1) 202, a sector address number 203, a synchronized signal (2) 205, a header (2) 206, and an information signal 207 are written successively. Ordinarily, about 200 bits are provided for the region (201 to 203) where signals relating to the sector address are written, and about 4,000 bits are provided for the region (204 to 207) for recording information signals. In the region for sector address number 203, an address number is written by counting up (or counting down) for every sector or for every rotation of the disk.

Next, when the sector, which is formatted by magneto-optical head 108b, is brought to the position of magneto-optical head 108a by the rotation of rotary motor 102 the formatting signals that were recorded previously under the control of formatting control unit 120 are reproduced (inspected). In the process of reproducing, exact detection of header (2) 206 is inspected, provided that sector address number 203 is detected exactly. Furthermore, detection is made of defects (scratches and the like) in region 207 for the information signals, which are beyond a predetermined standard tolerated by the system. The result of the detection is recorded by magneto-optical disk device control unit 113 in, for example, a predetermined region of magneto-optical disk 101 as an information for managing the formatting in order to process and manage the information for each sector.

In this manner, magneto-optical disk 101 is formatted with respect to sector control signals, prior to a recording of information. In addition, defects that are generated in sector control signals at the time of formatting, defects that existed in the information signal region of magneto-optical disk 101, and the like, are also detected and managed. Therefore, the result obtained has an extremely high reliability.

According to the present embodiment, use was made of two systems in recording information. However, even in the case of adopting the method of using just one system, erasing a recorded region in a first rotation and then recording information in a next rotation, it is similarly possible to detect defects during erasing. In this way, it becomes possible to provide a device that has high reliability with fewer system errors.

Figure 10:
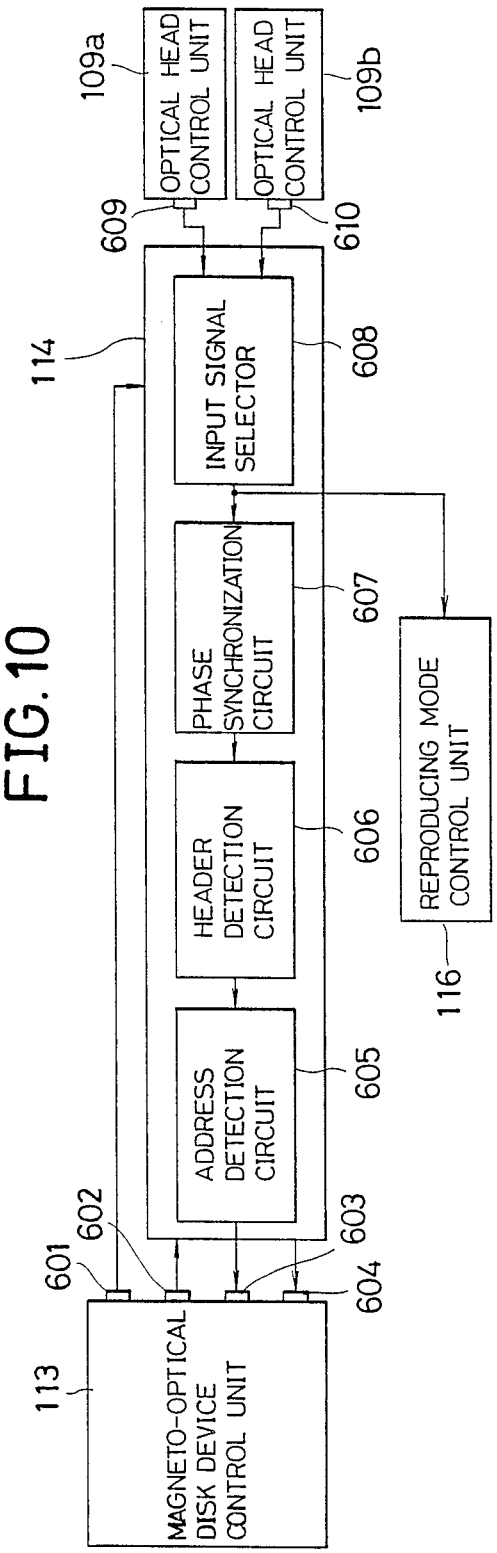
FIG. 10 is a schematic block diagram for a sector address detection.

In the above structure, reproduced signals are arranged to be sent directly to reproducing mode control unit 116 from optical head control units 109a and 109b. It may be arranged, however, to be sent via sector address control unit 114 (dotted line in FIG. 1). This case will be described by referring to FIG. 10.

A first reproduced signal, from an optical head reproduced signal outputting terminal 609 of optical head control unit (1) 109a, and a second reproduced signal, from an optical head reproduced signal outputting terminal 610 of optical head control unit (2) 109b of a signal which is recorded on magneto-optical disk 101, are input to an input signal selector 608 of sector address control unit 114. One of these two reproduced signals is selected in accordance with a signal from an optical head switching signal outputting terminal 601 of magneto-optical disk device control unit 113 to reproduce and detect the sector address. Namely, when a signal from a sector address detection command outputting terminal 602 from magneto-optical disk device control unit 113 is input to sector address control unit 114, the signal to a sector address detection status inputting terminal 604 becomes BUSY, and is selected by an input signal selector 608 which is indicated by a signal from the optical head switching signal outputting terminal 601. One of the reproduced signals which is selected is led to a phase synchronization circuit 607 to detect the starting position of a sector address signal of a header detection circuit 606, and reproduces and detects the sector address in an address detection circuit 605. Upon reproducing and detection of the sector address, the signal to sector address detection status inputting terminal 604 is changed to READY, and magneto-optical disk device control unit 113 reads the sector address which is detected. The other of the reproduced signals is sent out as an input signal to reproducing mode control unit 116.

Figure 11:
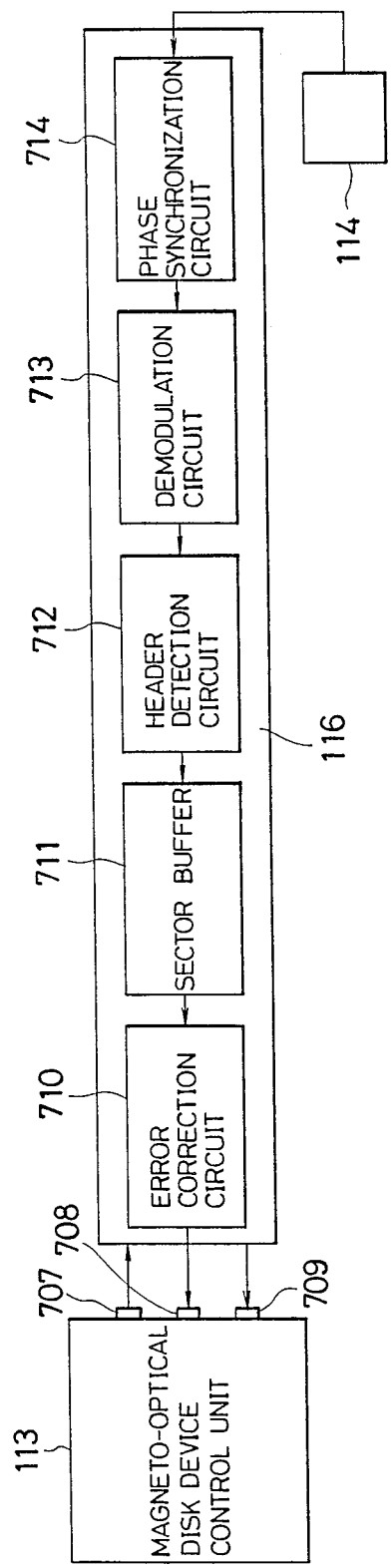
FIG. 11 is a block diagram for illustrating an embodiment of the reproducing mode control unit.

FIG. 11 is a diagram for illustrating details of the operation of reproducing mode control unit 116. The signal to a signal reproducing status inputting terminal 709 from reproducing mode control unit 116 is turned to BUSY by a signal from a signal reproducing command outputting terminal 707 of magneto-optical disk device control unit 113, and a reproduced signal from sector address control unit 114 which is indicated by the signal from optical head switching signal outputting terminal 601 and selected by input signal selector 608, led to a phase synchronization circuit 714, demodulated in a demodulation circuit 713, detects the beginning position of the information signal by header detection circuit 712, and is transferred to a sector buffer 711. The signal transferred to sector buffer 711 undergoes an error correction processing in an error correction circuit 710, the reproduced signal is transferred to a reproducing information signal inputting terminal 708 of magneto-optical disk device control unit 113. When the reproducing processing for a sector is completed, the signal-to- signal reproducing status inputting terminal 709 is changed to READY.

Figure 12:
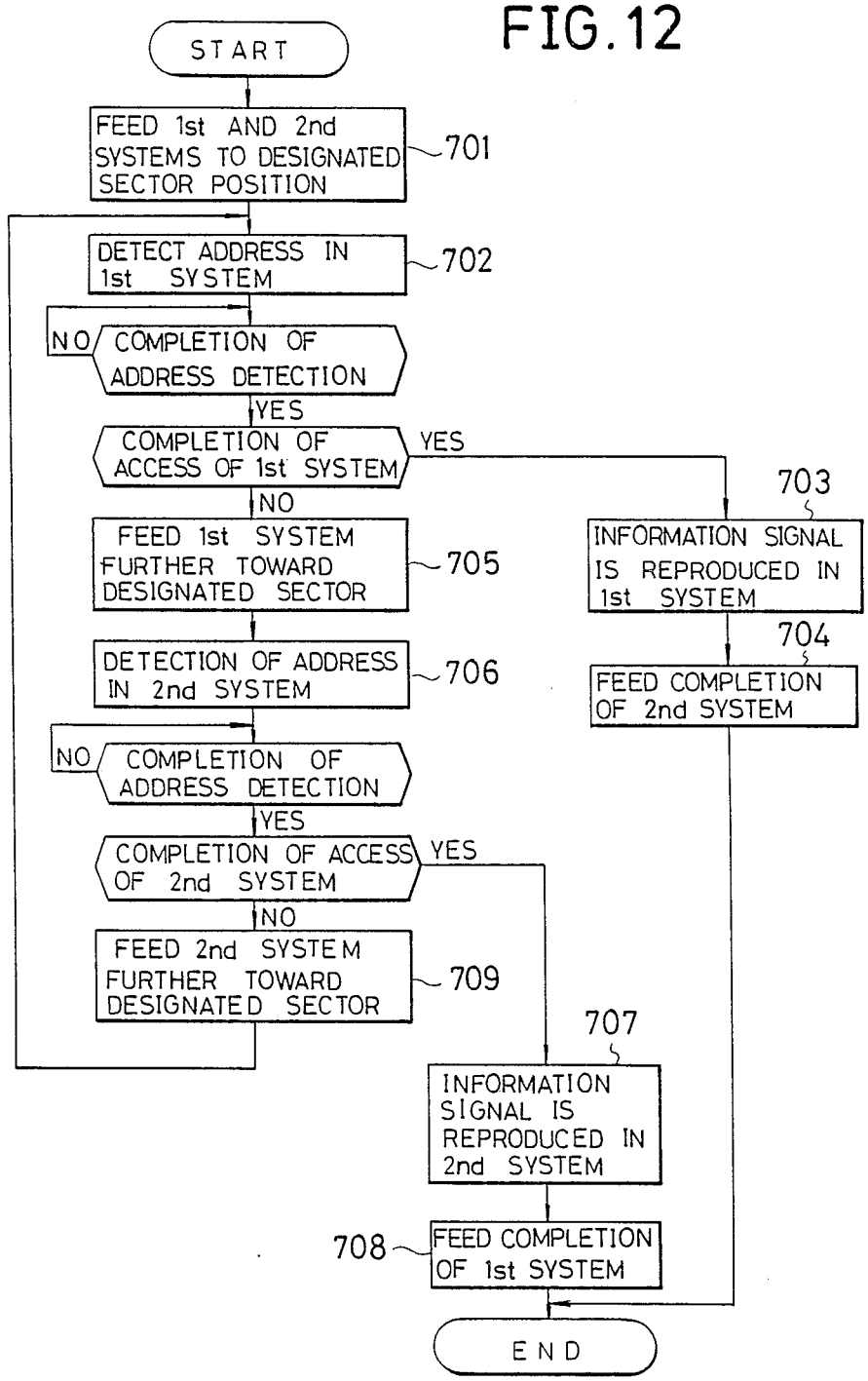
FIG. 12 is a flow chart for another embodiment of the invention.

FIG. 12 is a simplified diagram for showing the flowchart of operation of the first and the second systems in executing the reproducing mode. When a reproducing mode indication signal, information on the reproducing sector, and the like are transferred from an external system, magneto-optical disk device control unit 113 lets the first and second systems move to positions of an indicated sector (701). Next, upon completion of the moving of the first system, an optical head reproducing signal is selected in input signal selector 608, and a sector address is detected by sector address control unit (702). When the sector address of the first system which is detected is the indicated sector address, the information signal is continued to be reproduced in the first system without change (703), and at the same time, movement of the second system is completed (704). On the other hand, if the sector address detected differs from the indicated sector address, the first system is moved again in response to an amount of difference (705). Then, after confirming the completion of motion of the second system, an optical head reproducing signal is selected in input signal selector 608, and the sector address is detected in sector address control unit 114 (706). When the sector address of the second system which is detected is the indicated sector address, reproducing of an information signal in the second system is carried out without interruption (707). At the same time, motion of the first system is completed (708). On the other hand, if the sector address detected is different from the indicated sector address, the second system is moved again in response to a deviation (709), and then it returns to the operation (702) described above.

Moreover, although the magneto-optical disk above was divided radially by a spiral into equal sectors, the division may also be done concentrically.

Furthermore, the magnetic field generating element in the present embodiment was constructed using permanent magnets, it may also be formed by using electromagnets. An example of such an element will be described in what follows.

Figure 13:
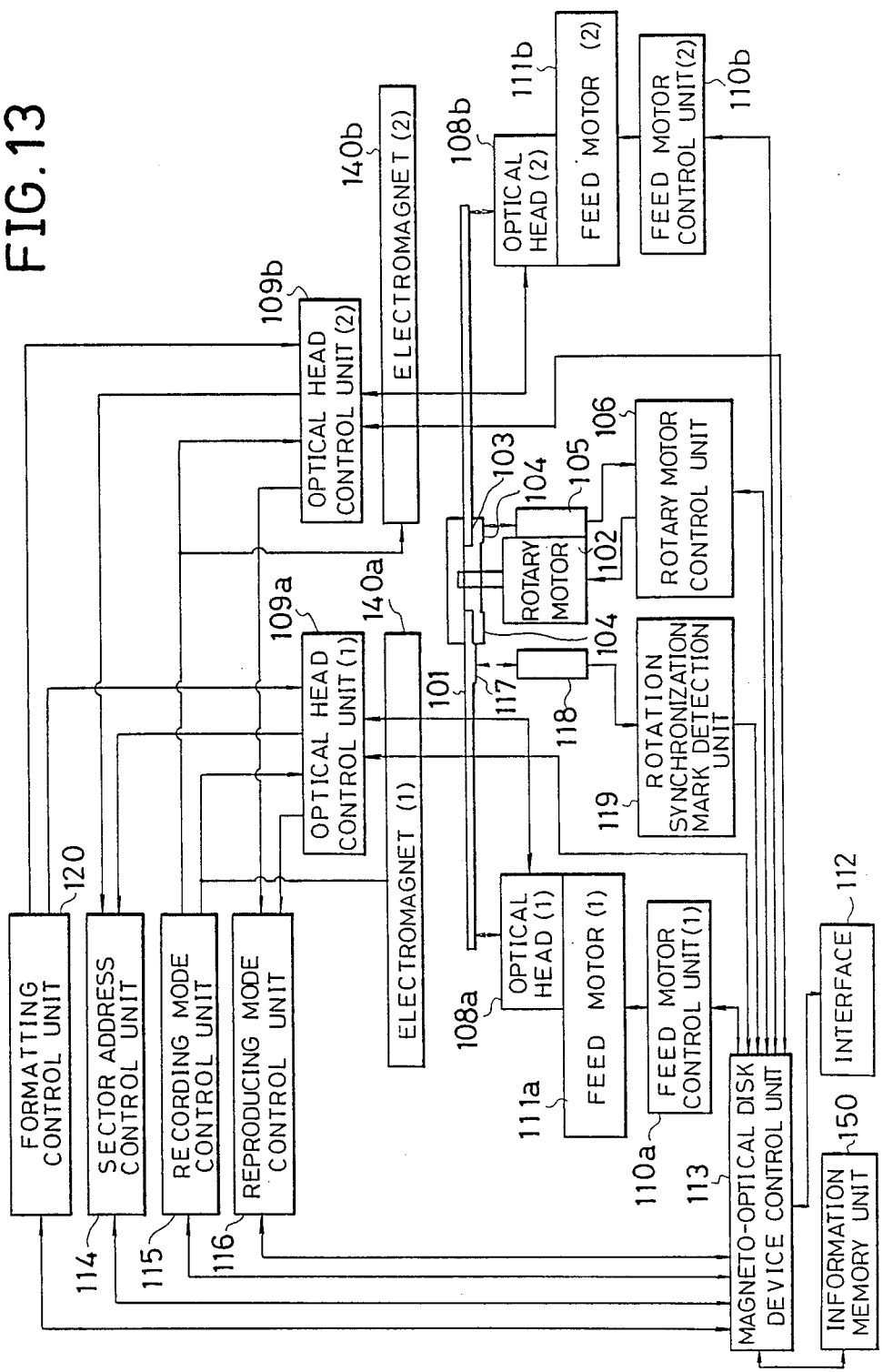
FIG. 13 is a schematic block diagram for another embodiment of the invention.

FIG. 13 is a diagram for illustrating a simplified structure of an optical information recording and reproducing device which uses a magneto-optical disk as the recording medium, and is another embodiment of the invention.

The magneto-optical disk 101 is mounted on turntable 103 above rotary motor 102. On turntable 103 there are patterned rotation controlling patterns 104 that have a predetermined separation radially. The rotation controlling patterns 104 are detected by the light detector for rotation control 105, and rotary motor 102 is driven and rotated by rotary motor control unit 106 to give it a predetermined speed.

Reference numerals 140a and 140b are magnetic field generating elements consisting respectively of electromagnets with mutually opposite polarities that can be inverted. These electromagnets have a sufficient radial length with respect to the information recording and erasing region of magneto-optical disk 101 and generate a magnetic field which is uniform and sufficient for recording and erasing.

Reference numerals 108a and 108b are optical heads (1) and (2) controlled by optical head control units 109a and 109b, respectively, where each head consists of a laser, photodetectors, an optical element and others for irradiating magneto-optical disk 101 with a laser beam and for detecting, tracking and focusing control signals and an information recording signal.

The optical heads (1) and (2) with reference numerals 108a and 108b are held respectively by feed motors (1) and (2) with reference numerals 111a and 111b and are connected to feed motor control units (1) and (2) with reference numerals 110a and 110b. These optical heads can be moved to an arbitrary radial position of magneto-optical disk 101. Further, a first system is formed by electromagnet (1) 140a, optical head (1) 108a, and feed motor (1) 111a. A second system is formed by electromagnet (2) 140b, optical head (2) 108b, and feed motor (2) 111b.

Figure 14:
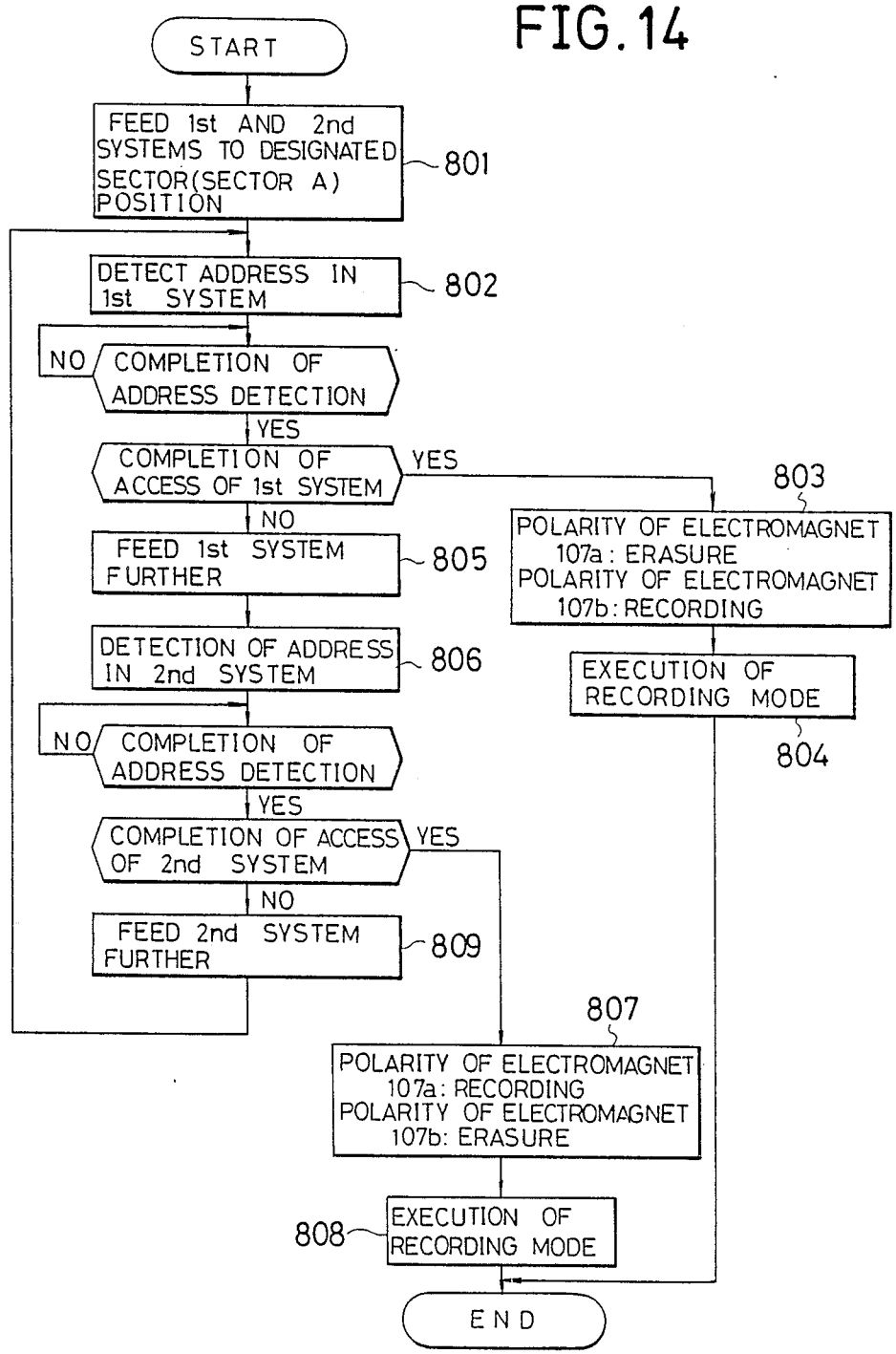
FIG. 14 is a flow chart for another embodiment of the invention.

FIG. 14 is a simplified diagram for illustrating the flow of operation of the first and second systems in an execution of the recording mode for recording information that is transferred from an external system.

When the recording mode indication signal, information on the recording sector, and others are transferred from an external system, magneto-optical device control unit 113 causes the first and second systems to move to a designated sector (sector A) position (801). Here, A represents the number of sectors which is determined by the system which corresponds to the time necessary for reversing the direction of the magnetic field. Next, when the feeding of the first system is completed, an optical head reproducing signal is selected by input signal selector 608, and a sector address is detected by sector address control unit 114 (802). If the sector address of the first system which is selected is the predetermined sector address, the polarity of electromagnet 140a is set to the erasing direction and the polarity of electromagnet 140b is set to the recording direction (803) to carry out the recording mode (804).

Namely, the first system is given access to a designated sector position, and the direction of the magnetic domains of information bit recording regions of each of the designated sectors are successively arranged to be uniform in a fixed direction by means of an erasure operation in which laser light with a predetermined intensity is irradiated continuously regardless of whether or not there exists prerecorded information.

On the other hand, if the sector address which is detected by the first system differs from the predetermined sector address, the first system is further fed in response to a deviation (805). After confirming completion of motion of the second system an optical head reproducing signal is selected by input signal selector 608 and the sector address is detected by sector address control unit 114 (806). If the sector address of the second system, which is detected, is the predetermined sector address the polarities of electromagnets 140a and 140b are set to recording and erasing directions, respectively, (807), for accomplishing the recording mode in accordance with a procedure similar to the one described in the foregoing.

Further, if the detected sector address differs from the predetermined sector address, the second system is further fed in response to deviation (809) and returns to an operation (802) described above. As in the foregoing, both the first and second systems are driven toward a designated sector, and an erasure operation of information is carried out using the system which is given access to the designated sector first and a recording operation of information is carried out with the other system. With this arrangement, the time waiting for rotation can be reduced to about one-half, realizing access at high speed.

Moreover, in the present embodiment, use was made of a fixed electromagnet with sufficient length in the radial direction as an external magnetic field generating element. However, it may be replaced by an electromagnet that can generate a magnetic field which is sufficient to record/erase the signal and is movable integrally with the feed motor. Also, a permanent magnet may be used as a magnetic field generating element in which the polarity of the magnet may be switched mechanically for recording and erasing.

Furthermore, the above embodiment may not be considered to be completely ready to handle continuously flowing signals such as music which is brought in successively. As a means for dealing with such a case, there may be provided an information memory unit 150, as shown FIG. 14, for temporarily recording information signals which are inputted from an external system to magneto-optical disk device control unit 113 via an interface 112. The information which is input to information memory unit 150 is read piece-by-piece as soon as it becomes ready for recording, and is sent to recording mode control unit 115. Or else, use may be made of a device in which unnecessary information is erased in the first optical system, and storing of information is carried out for a duration corresponding to the time for an erased region waiting to be recorded by the second optical system, due to rotation of rotary motor 102.

Moreover, various modifications will become possible without deviating from the scope of the present invention. Thus, for instance, by temporarily storing information, which corresponds to the waiting time for rotation, in the information memory unit it becomes possible to store information which is input continuously from the system side, from beginning to end, in close to real time without missing any portion.

We claim:

1. An information recording and reproducing system for recording and reproducing information on a magneto-optical disk, comprising:
   a magneto-optical disk having a number of sectors each having at least one address portion and information recording portion;
   a disk driving means for driving the magneto-optical disk placed on a turntable;
   a first optical system having a first magnet means, a first optical head, and a first optical head control means for carrying out an erasing operation on the disk prior to a recording of information on the disk and for carrying out a sector address reproducing operation on the disk; and
   a second optical system having a second magnet means, a second optical head, and a second optical head control means for carrying out an information recording operation on the disk and a sector address reproducing operation on the disk,
   said first and second optical heads being arranged and controlled such that when the first optical head is positioned at an address portion of one sector, the second optical head is positioned at an information recording portion of another sector, wherein when the first optical head is reproducing the sector address of the address portion, the second optical head is recording information to the information recording portion, and when the second optical head is positioned at an address portion of one sector, the first optical head is positioned at an information recording portion of another sector, wherein when the second optical head is reproducing a sector address of the address portion, the first optical head is erasing information from the information recording portion.

2. The information recording and reproducing system as claimed in claim 1, wherein said first and second optical heads are positioned so that an angular distance between the irradiating positions of said first and second optical heads deflects from any multiple of an angular length of said storage sector by no less than an angular length of said sector address storage section.

3. The information recording and reproducing system as claimed in claim 1, wherein the system further comprises:
   a single sector address control means connected to said first and second optical heads for detecting each sector address on the disk and for controlling each access of said first and second optical systems to each of predetermined sectors on the disk; and
   a magneto-optical disk control means connected to each of said sector address control means, said first and second optical head control means, and said disk driving means for moving said first and second optical systems in a radial direction of the magneto-optical disk, respectively, until each predetermined sector position is reached in accordance with a sector control signal.

4. The information recording and reproducing system as claimed in claim 1, wherein the system further comprises a defect detection circuit for detecting any defects on the disk, which consists of gate circuits, a condition setting section, a counter for counting output sector signals from said gate circuits, and a comparison section for comparing a predetermined set value in the condition setting section and a count from the counter.

5. The information recording and reproducing system as claimed in claim 1, wherein said first and second magnet means are a pair of permanent magnets each having a sufficient length in a radial direction of the magneto-optical disk and each arranged in an opposite direction in the magnet poles thereof and perpendicular to a surface of the disk.

6. The information recording and reproducing system as claimed in claim 1, wherein said first and second magnet means are a pair of electromagnet means, each having a sufficient length so as to produce a sufficient magnetic field strength, respectively, in a radial direction of the magneto-optical disk, with opposite polarities, respectively.

* * * * *